April 14, 1953
F. B. HALFORD ET AL
2,634,577
COMPACT CONTAINER ARRANGEMENT FOR PROPELLANT
FEEDING MEANS OF ROCKETS
Filed Dec. 27, 1949
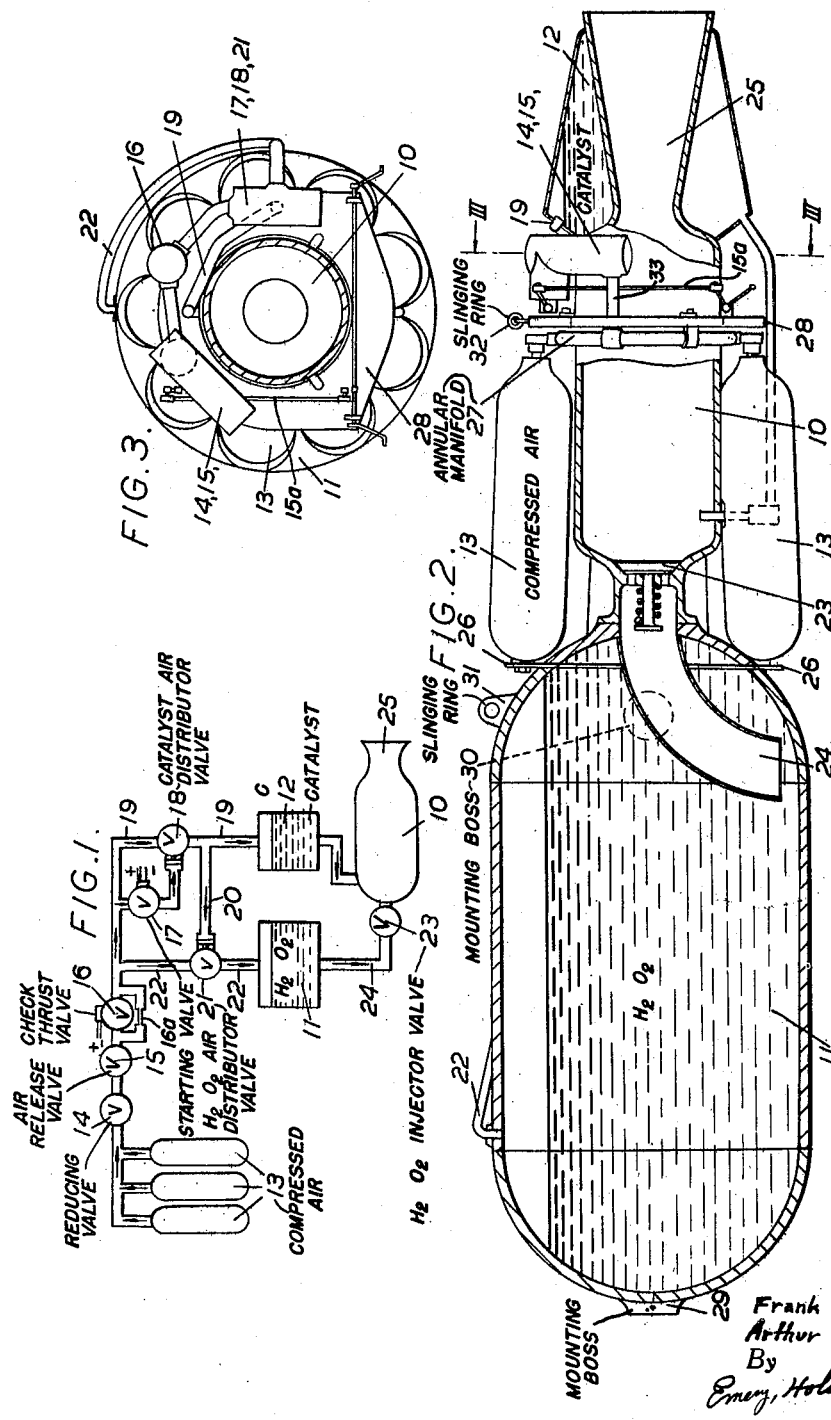
Inventors
Frank B. Halford
Arthur V. Cleaver
By
Emery, Holcombe & Blair
Attorneys Patented Apr. 14, 1953

2,634,577

UNITED STATES PATENT OFFICE 2,634,577

COMPACT CONTAINER ARRANGEMENT FOR PROPELLANT FEEDING MEANS OF ROCKETS

Frank Bernard Halford, Edgware, and Arthur Valentine Cleaver, London, England, assignors to The De Havilland Engine Company Limited, Stonegrove, Edgware, England, a company of Great Britain Application December 27, 1949, Serial No. 135,282
In Great Britain January 3, 1949

5 Claims. (Cl. 60—35.6)

This invention relates to rocket propulsion apparatus of the kind which is installed in or attached to an aircraft.

One form of rocket propulsion apparatus which has hitherto been proposed for assisting the take-off of an aircraft consisted of a spherical reservoir for hydrogen peroxide (which constituted the main propellant), a reaction chamber extending rearwardly from the reservoir, and a group of compressed air bottles and a cylindrical catalyst reservoir arranged side by side around the combustion chamber. The hydrogen peroxide and the catalyst were forced into the reaction chamber by the compressed air, whereupon the hydrogen peroxide dissociated into oxygen and steam which issued from the reaction chamber through a rearwardly directed nozzle with propulsive effect. The apparatus was enclosed in a streamlined cowling and was suspended beneath the aircraft on links from a pair of laterally spaced supports above the spherical propellent reservoir, and from a single support above the reaction chamber.

It is an object of the present invention to provide a rocket propulsion apparatus of this general type in which the parts are arranged in an improved manner so as to provide a more compact assembly.

According to the present invention a rocket propulsion unit for installation in or attachment to an aircraft includes a main propellent reservoir, a reaction chamber extending rearwardly from this reservoir and terminating in a convergent-divergent nozzle, a second reservoir in the form of an annular chamber surrounding the nozzle, and one or more containers for compressed air or gas arranged around the reaction chamber between the two reservoirs.

The invention may be carried into effect in various ways but one particular arrangement will be described by way of example with reference to the accompanying drawing in which Figure 1 is a diagram of the general arrangement of the rocket unit, Figure 2 is an elevation of the unit mainly in section, and Figure 3 is a cross-section of the unit taken on the line III—III in Figure 2.

As shown diagrammatically in Figure 1, the rocket unit consists of a reaction chamber 10 into which can be injected a main propellant, for instance hydrogen peroxide, from a reservoir 11, and a dissociation catalyst, for instance sodium or calcium permanganate, from a reservoir 12. The liquids are injected by compressed gas, for instance air, which is stored in bottles 13.

The compressed air passes first through an automatic pressure reducing valve 14 and then through an on-off or air release valve 15 to a check thrust valve 16. The air release valve 15 is under the control of the pilot of the aircraft through a linkage 15a (Figures 2 and 3) and when this valve is opened by the pilot it permits compressed air from the bottles 13 to pass into the apparatus beyond the air release valve, as far as valves 17, 18 and 21 referred to below. The air release valve 15 may be arranged to close automatically should the pressure on the upstream side thereof exceed a predetermined value, for instance in the event of failure of the reducing valve 14. Such an air release valve is described in U. S. Patent application Serial No. 135,285 in the names of the present applicants and Ernest Baker Dove filed December 27, 1949, now Patent No. 2,612,019, dated September 30, 1952. The reducing valve 14 and the air release valve 15 are contained in a common housing as shown in Figures 2 and 3.

The check thrust valve 16 is also under the control of the pilot. When it is opened it has a large flow cross-section to permit free passage of compressed air, but when it is closed the compressed air must pass through a small auxiliary passage 16a so that only a small flow of compressed air is permitted. The check thrust valve is closed only when it is desired to test or check the operation of the rocket unit without producing the full working thrust. Such a check thrust valve is described in U. S. patent application Serial No. 135,284 in the names of the present applicants and Ernest Baker Dove, filed December 27, 1941.

After passing the check thrust valve the compressed air passes to a starting valve 17. The starting valve 17 is a simple on-off valve under the control of the pilot of the aircraft. When this starting valve is opened, compressed air passes through it and acts on the pressure sensitive element of a pressure actuated catalyst air distributor valve 18. The latter valve is thus opened, and allows compressed air to flow through a pipe 19 and enter the catalyst reservoir 12 and so inject the catalyst into the reaction chamber 10. A portion of the compressed air which has passed through the catalyst air distributor valve 18 flows through a passage 20 and acts on the pressure sensitive element of a pressure actuated hydrogen peroxide air distributor valve 21. The latter valve is thus opened and allows compressed air to flow through a pipe 22 and enter the hydrogen peroxide reservoir 11 and so inject hydrogen peroxide into the reaction chamber 10 through a supply pipe 24 and an automatic pressure actuated injector valve 23. The starting valve 17, the catalyst air distributor valve 18 and the hydrogen peroxide air distributor valve 21 are all contained in a common valve housing as shown in Figure 3. Such an assembly is described in U. S. patent application Serial No. 135,286 in the names of the present applicants and Ernest Baker Dove filed December 27, 1949, now Patent No. 2,601,607. The injection valve 23 is a spring loaded valve which, when the pressure behind it is low (i. e. when the check thrust valve 16 is closed), opens only partially, and exposes a small passage for permitting only a limited flow of hydrogen peroxide to enter the reaction chamber. When the pressure behind it is high (i. e. when the check thrust valve 16 is open) it opens fully and admits a substantial flow of hydrogen peroxide into the reaction chamber. Such an injector valve is described in U. S. patent application Serial No. 135,283 in the names of the present applicants and Ernest Baker Dove filed December 27, 1949. The hydrogen peroxide which is injected into the reaction chamber thereupon dissociates, producing propellent gases which issue from the reaction chamber through a nozzle 25 with propulsive effect.

As shown in Figure 2, the hydrogen peroxide reservoir 11 is considerably larger than the catalyst reservoir 12 and is of generally cylindrical form with its axis in alignment with the axis of the reaction chamber. The catalyst reservoir 12 is in the form of an annular chamber disposed around the divergent portion of the nozzle 25.

Although it would be possible to store the compressed air or gas in an annular container surrounding the reaction chamber 10, it is preferred to store it as shown, in a number of bottles 13 arranged side by side around the reaction chamber. In either case, no point on the air or gas container or containers 13 is further from the axis of the unit than the outside of the hydrogen peroxide reservoir 11. The compressed air or gas bottles 13 are supported at their forward ends by brackets 26 secured to the rear end of the hydrogen peroxide reservoir 11, which brackets are sufficiently flexible to allow for some thermal expansion of the unit. At their rear ends the bottles are all connected to an annular manifold 27, through which the contents are conducted on their way to the reducing valve 14 via a pipe 33. The manifold 27 is secured to an annular web 28 surrounding and supported on the reaction chamber 10.

The housings of the valves 14 to 18, and 21 are supported on the annular web 28.

For the purpose of mounting the unit on the aircraft three bosses or trunnions are provided, one 29 at the forward end of the hydrogen peroxide reservoir and the others 30 on opposite sides of this reservoir near its rear end. The form of these bosses or trunnions is not material, and they may be arranged to suit the particular aircraft to which the rocket unit is to be fitted. When the unit is loaded the centre of gravity preferably lies within the triangle defined by these three bosses. The thrust is preferably taken by the two side bosses 30.

For handling the unit when it is removed from the aircraft a slinging ring 31 is secured to the top of the hydrogen peroxide reservoir 11 at the rear end thereof, and another slinging ring 32 is attached to the top of the annular rib 28. The centre of gravity of the unit when empty preferably lies between these slinging rings.

It will be appreciated that the invention is not limited to use with propellants consisting of hydrogen peroxide and a dissociation catalyst, since other propellants may be employed if desired.

What we claim as our invention and desire to secure by Letters Patent is:

1. A rocket propulsion unit for an aircraft comprising at the front of the unit a main reservoir for one liquid propellant, a reaction chamber extending rearwardly from said reservoir, a convergent-divergent nozzle on the rearward end of said reaction chamber, an annular chamber surrounding said nozzle and constituting a reservoir for a second liquid propellant, at least one storage container for gaseous pressure medium compactly arranged around the reaction chamber in the annular space between the two reservoirs, and controllable means for admitting said gaseous pressure medium to the propellent reservoirs to force the propellants from their respective reservoirs into said reaction chamber for gas-generating reaction therein.

2. A rocket propulsion unit as claimed in claim 1, in which the main propellent reservoir is of elongated generally cylindrical form with its axis in alignment with the axis of the reaction chamber, and all the parts to the rear of said main propellent reservoir lying substantially within the rearwardly produced external contour thereof.

3. A rocket propulsion unit as claimed in claim 1, in which the storage container for gaseous pressure medium comprises a plurality of bottles arranged side by side around the circumference if the reaction chamber.

4. A rocket propulsion unit as claimed in claim 3, including an annular manifold, connecting means between said manifold and the rear ends of said bottles, said manifold constituting a conduit through which the gaseous pressure medium is conducted from the bottles on its way to the propellent reservoirs.

5. A rocket propulsion unit for an aircraft, comprising a main reservoir of elongated generally cylindrical form for one liquid propellant the axis of said reservoir coinciding with the main axis of the unit, a reaction chamber extending rearwardly from said reservoir, a convergent-divergent nozzle at the rearward end of said reaction chamber, an annular chamber surrounding said nozzle and constituting a reservoir for a second propellant liquid, at least one storage container for gaseous pressure medium arranged around the reaction chamber between the two reservoirs and controllable means for admitting said gaseous pressure medium to the propellent reservoirs to force the propellants from their respective reservoirs into said reaction chamber for gas-generating reaction therein, the distance of the furthest point of the main propellent reservoir from the axis of the unit in any radial plane being at least at great as the distance of the furthest point of the said container in the same radial plane.

FRANK BERNARD HALFORD.
ARTHUR VALENTINE CLEAVER.

References Cited in the file of this patent

UNITED STATES PATENTS

| Number | Name | Date |
|---|---|---|
| 2,400,248 | Morgan | May 14, 1946 |
| 2,426,537 | Van Dorn | Aug. 26, 1947 |
| 2,434,298 | Truax | Jan. 13, 1948 |
| 2,505,798 | Skinner | May 2, 1950 |
| 2,523,008 | Goddard | Sept. 19, 1950 |
| 2,532,708 | Goddard | Dec. 5, 1950 |

FOREIGN PATENTS

| Number | Country | Date |
|---|---|---|
| 293,594 | Great Britain | Aug. 16, 1928 |
| 477,022 | France | June 24, 1915 |
| 625,104 | France | Apr. 19, 1927 |

OTHER REFERENCES

"Rocket Powerplant" by M. J. Zucrow; S. A. E. Journal, July 1946; pages 387 and 388.

"The Conquest of Space" by Lasser (1931), Rocket Problems, pages 70-74.